United States Patent [19]

Embry

[11] Patent Number: 4,945,872

[45] Date of Patent: Aug. 7, 1990

[54] THEFT PREVENTION APPARATUS

[76] Inventor: Paul E. Embry, Rte. 2, Box 40, Ragland, Ala. 35131

[21] Appl. No.: 233,730

[22] Filed: Aug. 19, 1988

[51] Int. Cl.$^5$ ............... B60R 25/04; F02P 11/04; H01R 31/08

[52] U.S. Cl. .................... 123/146.5 B; 180/287; 307/10.5; 439/511; 439/911; 70/DIG. 46

[58] Field of Search .............. 123/146.5 B, 198 B, 123/198 DC, 594, 595, 630, 647; 307/10.5, 10.3, 10.2; 180/287; 439/507, 509, 511, 911, 148; 70/DIG. 46

[56] References Cited

U.S. PATENT DOCUMENTS

| | | | |
|---|---|---|---|
| 1,393,822 | 10/1921 | Parker | 123/146.5 B |
| 3,004,170 | 10/1961 | Greenspan | 307/10.5 |
| 3,644,745 | 2/1972 | Bell | 307/10.3 |
| 3,907,060 | 9/1975 | Burton et al. | 123/198 B |
| 3,915,542 | 10/1975 | Schou-Kjeldsen | 123/647 |
| 4,037,577 | 7/1977 | Gallo | 123/595 |
| 4,071,007 | 1/1978 | Arix | 123/146.5 B |
| 4,300,495 | 11/1981 | Trevino et al. | 123/198 B |
| 4,452,197 | 6/1984 | Weber | 123/198 B |
| 4,545,343 | 10/1985 | Cook et al. | 123/198 B |

FOREIGN PATENT DOCUMENTS

| | | | |
|---|---|---|---|
| 2922323 | 12/1980 | Fed. Rep. of Germany | 123/630 |
| 54-158532 | 12/1979 | Japan . | |
| 57-76261 | 5/1982 | Japan . | |
| 58-4634 | 1/1983 | Japan | 180/287 |
| 656363 | 8/1951 | United Kingdom | 123/146.5 B |
| 1259941 | 1/1972 | United Kingdom . | |

Primary Examiner—Andrew M. Dolinar

[57] ABSTRACT

A disabling device for electronic circuits includes a female connector with an easily accessible front surface and an inaccessible rear surface. A large array of contact pairs are found in the female connector. A predetermined number of input/output wires join the female connector in series with the circuit across randomly selected contact pairs in the array. A number of non-functional dummy wires also connect in the array to further complicate the non-uniform connection pattern. When a male connector containing an internal arrangement of jumper wires is inserted into the female connector, the jumper wires short across the proper contact pairs and close the circuit. Subsequent removal of the male element again opens and disables the circuit.

4 Claims, 2 Drawing Sheets

THEFT PREVENTION APPARATUS

BACKGROUND OF THE INVENTION

The present invention relates to the field of crime prevention. More particularly, the apparatus prevents misappropriation of electronic devices. Even more particularly, the apparatus seeks to frustrate an automobile thief by disabling the target vehicle's ignition system.

Numerous devices have been devised to prevent motor vehicle theft, including those disclosed in U.S. Pat. Nos. 3,907,060; 4,037,557; 4,071,007; 4,300,495; 4,452,197; 4,545,345; Japanese Patent Nos. 53-66996; 55-151706; and Great Britain Patent No. 1,259,941. Each of these prior art devices utilize owner operable switching means to disable the motor vehicle ignition system. Typically, such systems are turned on and off by manually operated switches mounted in hidden or obscure places in the driver's compartment. The switches are normally mounted in the glove compartments or beneath the dashboards where they are obscured from view, yet conveniently accessible to those who know of their existence and location. If the vehicle owner throws the switch, the anti-theft circuitry is activated to interrupt the ignition circuitry or to disable a key engine starting component.

In practice, these devices are only marginally effective against an experienced auto thief. When a thief seeks to start a motor vehicle and is confronted by a completely dead ignition system, a search for the obscure control switch is immediately initiated. Only a limited number of easily accessible master control switch locations are available in the interior of an automobile, so a practiced thief usually locates the switch after a brief search. Most professional auto thieves acquire quite extensive knowledge of motor vehicle wiring configurations while playing their trade, and may easily bypass any ignition foiling device. Many recent auto anti-theft systems incorporate a loud alarm system which may be activated by such a by-pass attempt. However, these alarms may also be easily disconnected by an experienced practitioner. Conventional theft prevention circuitry is thus only an inconvenience for the professional thief, and is effective only by lengthening the time required for misappropriation of the vehicle.

Some inventors sought to remedy the above dilemma by designing increasingly complex anti-theft circuits incorporating digital computer logic or computer activated servo systems. These devices may be more effective against theft, but reliability problems and complex arming procedures engendered numerous owner complaints. In addition, perplexing diagnostic and repair problems arise in the event of a system malfunction. Such complexity increases costs and necessitates factory installation. None of the known motor vehicle anti-theft devices are totally satisfactory in terms of economy, efficiency and simplicity.

SUMMARY OF THE INVENTION

It is an object of the present invention to provide an effective theft prevention apparatus for any electronic device, particularly a motor vehicle. It is a further object of the present invention to provide such an apparatus which is convenient to operate and easily repaired. Yet another object of the present invention is to provide an anti-theft apparatus which may be installed by a vehicle owner.

To accomplish these objects I have designed a simple intervening device for disabling the ignition circuit of a motor vehicle. The system utilizes a female connector element which is mounted in the automobile interior, preferably on the dashboard or steering column. The outwardly facing front surface of the female connector features a depression which accepts a male element to be described below. A slidable dust cover prevents entry of foreign objects into the depression until the male connector is inserted therein. The inaccessible rear surface of the female element features a plurality of outwardly projecting terminal for connection of electrical wires.

Inserting the device into the ignition circuit necessitates severing the wires which link critical ignition system components (battery, switch key, coil, distributor/electronic ignition module). Two loose ends will remain after the cutting of wire. The loose ends of each wire are connected to a randomly selected pair of terminals on the female connector, effectively inserting the female connector in series with the wire.

To further complicate the device, a number of non-functional dummy leads are also wired into the terminal array. The dummy wires resemble the functional wires in appearance, so detection is difficult.

Since each critical ignition wire is now series connected across a predetermined pair of terminals, means must be available to short across each terminal pair and close the circuit. To accomplish this, a male connector is provided for insertion into the depression in the front surface of the female connector. Short jumper wires in the interior of the male connector are arranged to short across the proper terminal pairs. Unless the male connector is plugged into the female connector, the ignition circuit remains open across the terminal pairs. The male connector must be inserted to complete the circuit. With the male connector removed the wiring is effectively cut and the motor vehicle cannot be started.

In operation, the male connector may be carried on the motor vehicle owner's key ring, in a purse, or in a pocket. After entering the vehicle cockpit, the male connector is simply inserted into the depression in the female connector. The ignition system is thereafter operational and the vehicle may be driven normally. The owner need only remove the male connector after cessation of vehicular operation. The ignition system is thereafter completely disabled until the male connector is reinserted. If a thief attempts to steal the vehicle, each of the critical ignition wires terminating on the rear surface of the female connector must be properly reconnected to enable the ignition circuit. The random arrangement of wires attached to the terminal array is known only by the owner, and will of course be varied from vehicle to vehicle. Proper reconnection of the wires will be extremely time-consuming if the sequence is not known. Inclusion of the dummy wires merely multiplies the complexity. The multitude of different connection sequences will hopefully frustrate even an experienced thief.

My invention constitutes a significant innovation in motor vehicle anti-theft systems. The simplicity of the device is readily apparent—no complex circuits or computers are required. So, ignition system reliability and diagnostic simplicity are retained. The device may be factory installed as a low cost option or may be easily installed by the owner as an after market item. But even while conceptually simple, the enormous number of possible connection sequences will challenge professional thieves.

While the above discussion has focused on the disabling of motor vehicle ignition circuits, it is obvious to those skilled in the art that my invention may be employed to prevent unauthorized use of any electronic device. The simple concept may be applied to all electric circuits.

BRIEF DESCRIPTION OF THE DRAWINGS

Apparatus embodying features of my invention are depicted in the accompanying drawings, which form a portion of this application, and wherein.

DESCRIPTION OF A PREFERRED EMBODIMENT

Figure 1:
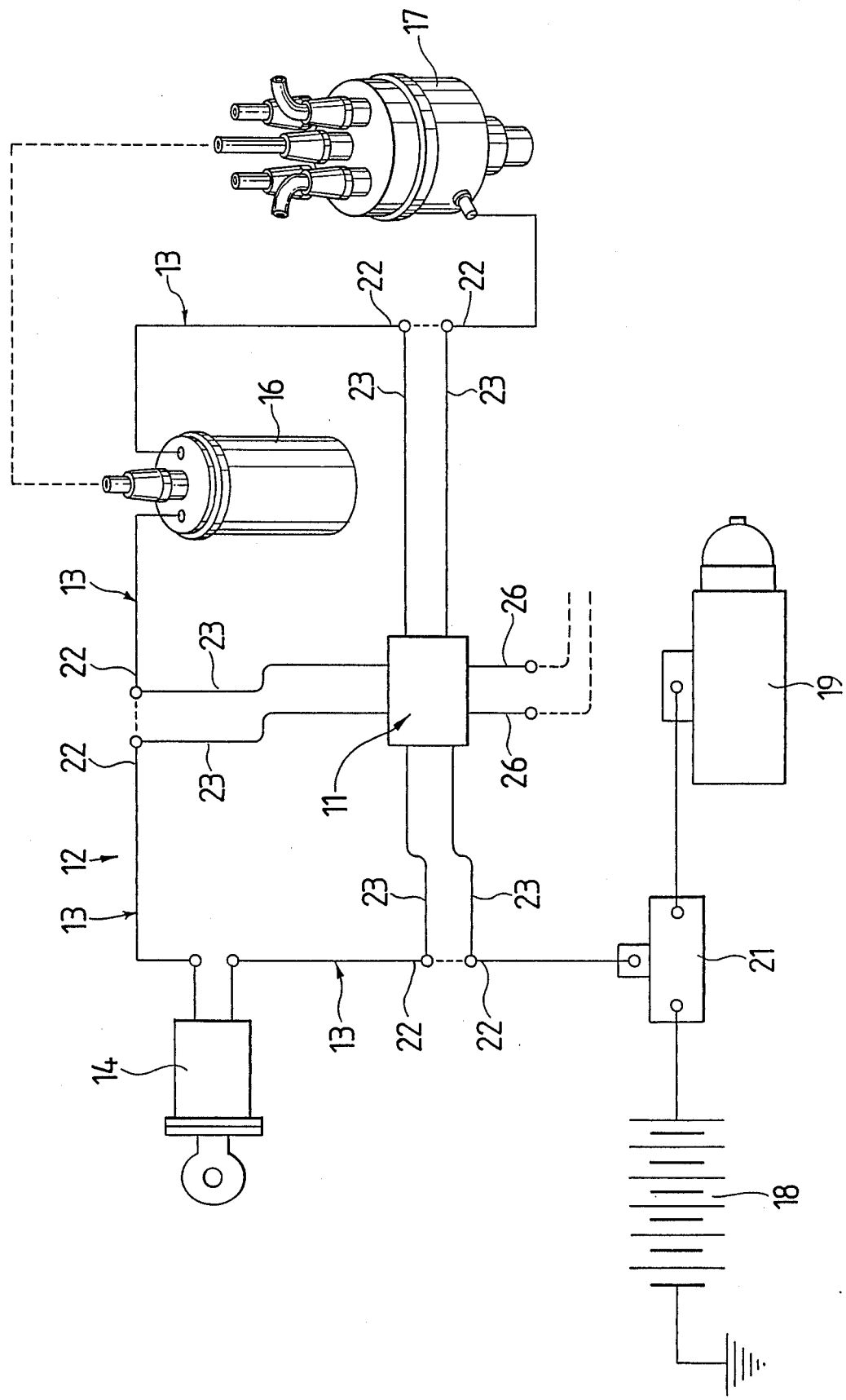
FIG. 1 is a simplified automotive ignition circuit diagram showing my invention series connected therein.

FIG. 1 diagrammatically depicts my invention as incorporated into a simplified motor vehicle ignition circuit. A female connector 11 may interrupt the circuit 12 at any point—only one general configuration is shown. As is well known, a number of wires 13 link critical ignition circuit elements such as an ignition switch 14, a coil 16 and a distributor/electronic ignition module 17. A storage battery 18 powers the circuit 12 and a starter 19 via a relay 21.

Incorporation of the female connector 11 into the circuit 12 necessitates severing a predetermined group of the wires 13. After each of the wires 13 are cut, a pair of loose ends 22 are created at each point of severance. A pair of input/output wires 23 join each pair of loose ends 22 with a pre-selected terminal pair 24 on the rear surface of the female connector 11.

The terminal pairs 24 may be selected at random from a large array of contacts on the rear surface of the female connector 11. While only one connection pattern is shown as an example note that a large number of connection patterns are possible. The complexity of the randomized connection patterns increases with the inclusion of a variable number of nonfunctional dummy wires 26 among the available terminal pairs 24. The insulation on the dummy wires 26 may be made indistinguishable from the insulation on the input/output wires 23. The dummy wires 26 may simply terminate at a loose end on the motor vehicle firewall or may be joined into the circuit 12 and subsequently broken internally.

Figure 2:
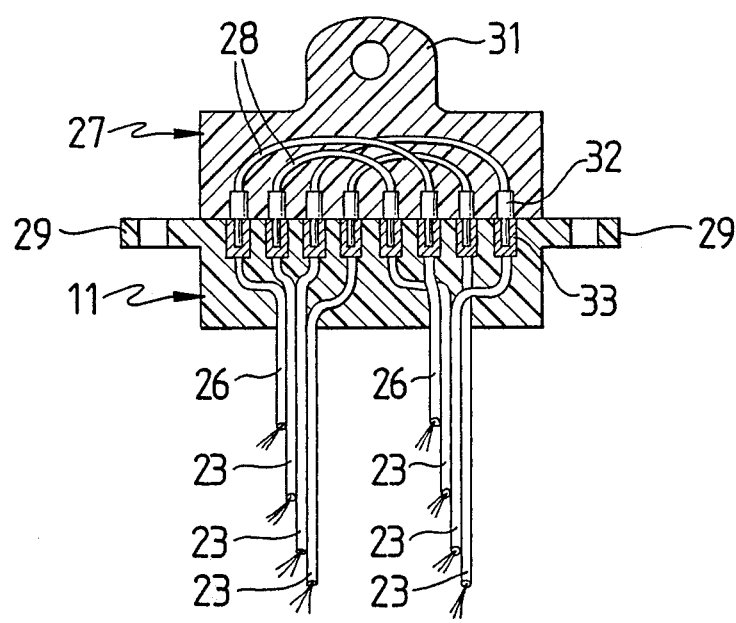
FIG. 2 is a sectional view of my invention showing the terminal pairs on the female connector and the associated jumper wires in the male connector.

After all the input/output wires 23 and the dummy wires 26 are connected to their respective terminal pairs 24, the female connector 11 is in series with each of the ignition wires 13. The circuit 12 may now only be closed by properly shorting across each of the terminal pairs 24. As shown in FIG. 2, a male connector 27 plugs into the female connector 11 and performs the shorting function. An internal arrangement of jumper wires 28 inside the male connector 27 is configured to properly reconnect the terminals in each of the terminal pairs 24. Only proper connection enables the ignition circuit 12. Once again it must be emphasized that the illustrated arrangement is merely one of a large number of various combinations. The plurality of connection patterns provides the necessary complexity for frustration of professional thieves. No complex computers or electronic devices are required, so reliability and simplicity are maintained.

Figure 3:
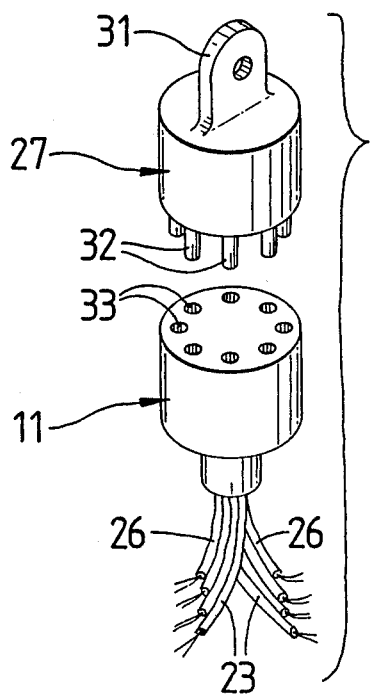
FIG. 3 is an exploded perspective view of one embodiment of my invention.
Figure 4:
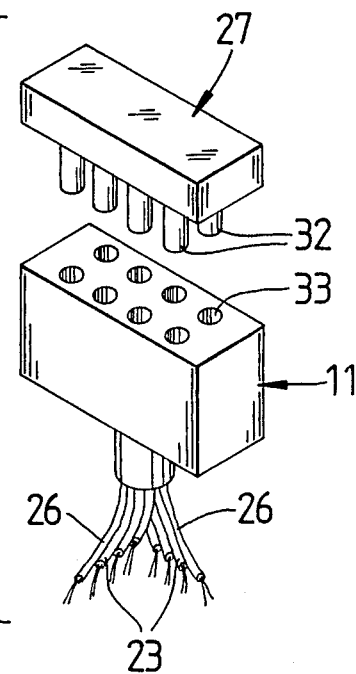
FIG. 4 is an exploded perspective view of another embodiment of my invention.

FIGS. 2, 3 and 4 show several possible housing embodiments for the female connector 11 and male connector 27. In FIG. 2, mounting tabs 29 are provided for attachment of the female connector 11 to a flat surface in a motor vehicle interior. Another tab 31 on the male connector 27 adapts the housing for suspension from a key chain or cord. FIG. 3 shows a rounded configuration which allows the male connector 27 to be carried comfortably in the motor vehicle owner's pocket or handbag after removal. A plurality of pins 32 in the male connector 27 are inserted into a group of cooperating receptacles 33 in the surface of the female connector to insure secure connection. An alternative rectangular housing configuration is shown in FIG. 4.

While I have shown my invention in various forms, it will be obvious to those skilled in the art that it is not so limited but is susceptible of various changes and modifications without departing from the spirit thereof.

What I claim is:

1. A theft prevention apparatus for use in combination with a device having an electrical circuit therein wherein said electrical circuit has a number of components and a plurality of wires connecting said components, comprising:

(a) a female terminal having distinct electrically isolated contact points:

(b) a plurality of paired input and output wires having a first end of each one of said input and output wires connected to a distinct contact point and a second end serially connected to said connecting wires intermediate selected ones of said components, thereby creating an open circuit, said first ends being connected to said contact points in random pattern;

(c) a plurality of non-functional dummy wires connected to selected electrically isolated contact points on said female connector; and (d) a male terminal for closing said circuit comprising a concealed internal network of jumper wires corresponding to said random pattern connection of said input and output wires such that each jumper wire connects a pair of contact points which are connected to the first ends of paired input and output wires.

2. A disabling device as defined in claim 1 wherein said female terminal has an easily accessible front surface and an inaccessible rear surface.

3. An anti-theft device for selectably opening and closing an electronic circuit, said device comprising:

(a) a female connector having an accessible front surface and an inaccessible rear surface;

(b) a non-uniform array of contact pairs projecting outwardly from the rear surface of said female connector;

(c) a number of functional input wires from said circuit to said female connector, each input wire terminating on a first contact of a randomly selected contact pair;

(d) a number of functional output wires from said female connector to said circuit, each output wire emanating from a second contact of said randomly selected contact pair;

(e) a number of non-functional input and output wires attaching within said array of contact pairs, said non-functional wires being indistinguishable in appearance from an functional wires; and
(f) a male connector having a preselected internal arrangement of jumper wires, said jumper wires shorting across said contact pairs to effect closure of said circuit when said male connector is inserted into the front surface of said female connector.

4. A theft prevention apparatus for opening and closing a motor vehicle ignition circuit, said apparatus comprising:
(a) a female connector mounted in the cockpit of said vehicle, said connector having an accessible front surface and an inaccessible rear surface;
(b) a plurality of independent contact pairs found on the interior of said connector;
(c) a number of functional input wires from said circuit, each input wire being affixed to a first contact of a randomly selected contact pair;
(d) a number of functional output wires to said circuit, each output wire being affixed to a second contact of one said randomly selected contact pair such that said female connector is series connected across said contact pairs;
(e) a number of non-functional input and output wires affixed to at least one of said contact pairs, said non-functional input and output wires resembling said functional input and output wires; and
(f) a male plug member having an internal configuration of jumper wires arranged for placement across said contact pairs, said ignition circuit being closed and operable when said made plug member is inserted into the front surface of said female connector.

* * * * *